2 Sheets—Sheet 1.
W. STANTON.
Assignor of one-half interest to W. H. WHITEHEAD.
Device for Unloading Grain from Ships.
No. 8,452. Reissued Oct. 15, 1878.
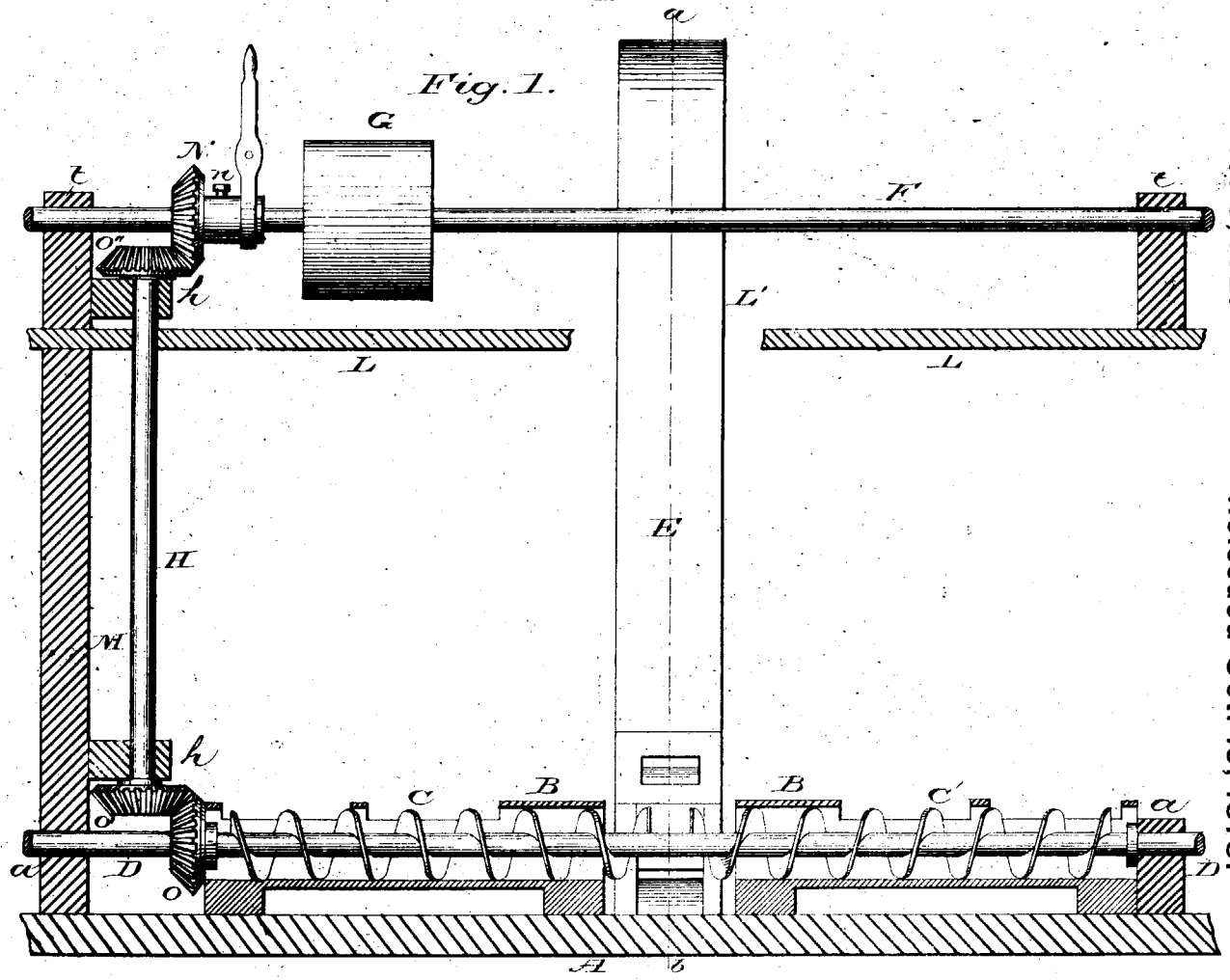
Witnesses:
M. C. Dunlap
W. A. Lott
Inventor:
William Stanton 2 Sheets—Sheet 2.
W. STANTON.
Assignor of one-half interest to W. H. WHITEHEAD.
Device for Unloading Grain from Ships.
No. 8,452. Reissued Oct. 15, 1878.
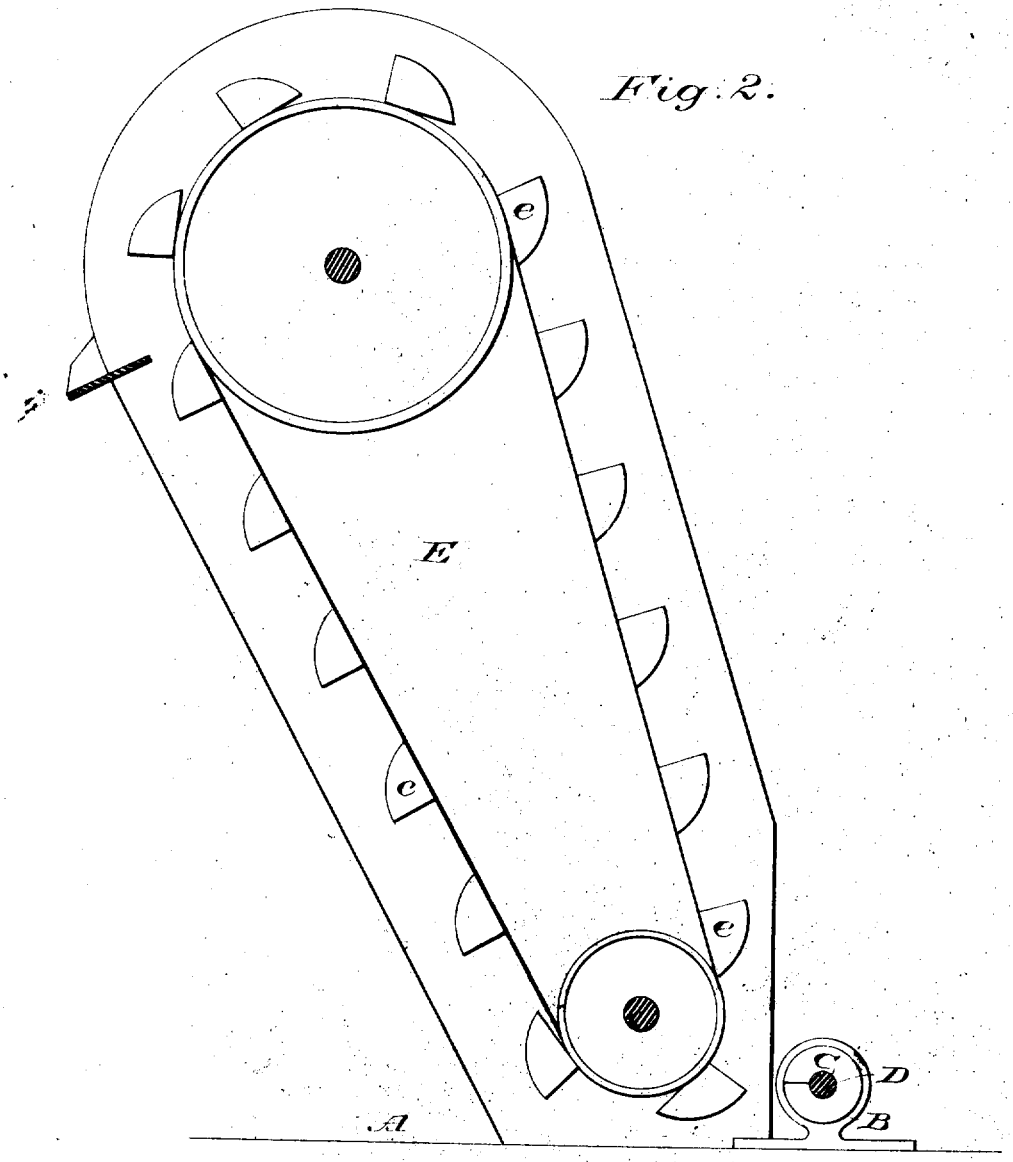
Witnesses:
M. E. Dunlop
W. A. Cott
Inventor:
William Stanton

UNITED STATES PATENT OFFICE.

WILLIAM STANTON, OF ERIE, PENNSYLVANIA, ASSIGNOR OF ONE-HALF INTEREST TO WILLIAM H. WHITEHEAD, OF SAME PLACE.

IMPROVEMENT IN DEVICES FOR UNLOADING GRAIN FROM SHIPS.

Specification forming part of Letters Patent No. 160,479, dated March 2, 1875; Reissue No. 8,452, dated October 15, 1878; application filed April 13, 1878.

*To all whom it may concern:*

Be it known that I, WILLIAM STANTON, of Erie, in the county of Erie and State of Pennsylvania, have invented a new and useful Improvement in Devices for Transferring Grain from Ships, Boats, Vessels, &c., of which the following is a specification:

My device is intended to operate in conjunction with the "leg" of a grain-elevator building, and to perform said office in the bottom of a ship's hold at the foot of the leg.

The object and purpose of the device are to convey the grain from the ends of the compartment of the hold laterally to the foot of the leg, thereby doing the work heretofore performed by shoveling the grain by hand.

To this end, therefore, my invention consists of a new method of transferring grain from ships' holds, and in providing means whereby this method can be carried out. These devices are lateral conveyers, operating in proper casings or boxes, and the necessary mechanism for operating the same, said conveyers being so placed and arranged in conjunction with the elevator-leg as to convey the grain from the remote parts of the compartments to the foot of said leg.

In the accompanying drawings I have shown how my method of transferring grain from ships' holds may be carried out, and how devices for that purpose may be constructed and operated.

The accompanying drawings illustrate my invention, as follows: Figure 1 is a vertical section of a compartment of a ship's hold. Fig. 2 is a vertical section through the leg of an elevator-building, and shows the relation thereto of my attachments.

The letters of reference indicate parts as follows: A represents the bottom of a ship's hold; M L, one end and the deck of the compartment wherein the grain is stored. L′ is the hatchway. E is the elevator-leg. C C′ are the lateral conveyers, and B represents the casing or box of the conveyers. The other parts will appear in the following general description.

In order that the grain may be conveyed to the leg from each side, I use right and left conveyers C C′. These conveyers are of common construction, being worm-screws on a shaft, D. In order that the grain can be conveyed by these screws a box or casing, B, is provided. This box should be open at the top, so that the grain can freely enter the same; but at or near the elevator-leg the box should be closed at the top, as shown in Fig. 1, so as to compel the grain to pass directly to the foot of the leg, and not leave the conveyer in case of undue pressure from accumulated grain at that point, and pile up on the sides of the box out of reach of the elevator-buckets. The length of the conveyers depends upon the length of the storage-compartment. They may be built as a fixture in the ship, or so as to be removable, as desirable. As the hatchways are not always in the center of the compartment the right and left conveyers will often vary in length relatively.

The devices for operating these conveyers should be so constructed that, when there are a series of compartments each having its separate set of lateral conveyers, any one of this series of conveyers can be operated independently of the others, for it will not do to operate the conveyers in those compartments not being emptied.

All of the series may be operated from one line of shafting, and if so it should be provided with means for throwing into and out of gear each separate set of conveyers. As a means to this end I herewith show a line-shaft, F, located above the grain to be removed, the bevel-gear O on the conveyer-shaft D in each compartment, the bevel-gear N on the line-shaft F, directly above the gear O, a vertical connecting-shaft, H, with bevel-gears O′ O″ secured in proper bearings *h h* on the sides of the compartment. I make the gear N movable, so as to act as a clutching device. Any form of clutching device may be used.

Having thus described the means by which my improved method of unloading grain-ships may be accomplished, I come next to the *modus operandi*, or the application of such devices to the purposes for which they are designed.

The elevator-leg is inserted through the hatchway L′ in the usual way, and the work of elevating goes on until, under the old method, it is necessary to send workmen into the hold to shovel the grain to the foot of the leg. At this juncture the conveyers C C′ of that compartment are set in motion, and they convey all the grain banked over them to the elevator-leg, which carries it up. As the conveyers will run the long way of the compartment, very little grain will remain banked up beside them. This, however, will be shoveled upon the conveyer and be taken by it to the leg. Therefore what little grain it is necessary to shovel will have to be shoveled only a short distance, and the unloading of the compartment is thus finished.

By the use of my invention there is a great saving of time and labor.

I am aware that it is a very common practice to use screw-conveyers to convey grain laterally. Such devices are common in flour-mills, grain-elevators, &c.

I am also aware that lateral grain-conveyers in the form of endless belts, with buckets or pockets attached, have heretofore been used in ships' holds to convey grain up to the elevator-leg. (See patent to D. A. Morris, October 13, 1874.)

I do not desire to be limited to the means I have shown for operating these screws, as there are many well-known mechanical expedients that will instantly suggest themselves for this purpose. The essential features of my invention consist in placing the conveyers C C′ at the bottom of each compartment of the ship's hold, and arranging them so that each separate set can be operated while the elevator is taking up the grain in that compartment, leaving the sets of conveyers in the other compartments undisturbed.

My invention, therefore, consists in adapting a screw-conveyer for use in unloading ships.

I am aware that endless-belt conveyers have been used in a similar position to that occupied by my screw-conveyers.

What I claim is as follows:

1. In the several grain-compartments of a ship's hold, right and left encased screw-conveyers C C′, generally open at the top, in combination with a line driving-shaft, F, and connecting-gearing and the elevator-leg E, substantially as and for the purposes set forth.

2. The combination, with the right and left screw-conveyers C C′, and their operating-gearing, arranged in the separate grain-storing compartments of a ship's hold, of the line-shaft F with its attachments, said conveyers in each compartment arranged to operate independently of the others as each separate compartment is emptied of its grain, and the leg of the elevator is shifted from an empty to a filled compartment, as herein set forth.

3. In the stowage-compartment of a ship, a screw-conveyer adapted to operate in conjunction with the leg of an elevator-building, in combination with a box or casing, B, which is generally open at the top, except near the said leg, where it is so constructed as to wholly incase the said conveyer, substantially as and for the purposes set forth.

In witness whereof I, the said WILLIAM STANTON, have hereunto set my hand.

WILLIAM STANTON.

In the presence of—
JNO. K. HALLOCK,
W. H. WHITEHEAD.